US005735353A

United States Patent [19]

Undin

[11] Patent Number: 5,735,353

[45] Date of Patent: Apr. 7, 1998

[54] SERVO-PLIERS

[75] Inventor: Hans Undin, Osterskar, Sweden

[73] Assignee: Weidmuller Interface GmbH & Co., Detmold, Germany

[21] Appl. No.: 430,863

[22] Filed: Apr. 28, 1995

[30] Foreign Application Priority Data

Apr. 28, 1994 [DE] Germany .......................... 44 14 967.0

[51] Int. Cl.[6] .............................. B25B 7/00; B23D 29/02

[52] U.S. Cl. .............................. 173/11; 173/170; 30/180; 30/228; 81/367

[58] Field of Search ........................ 173/170, 11; 30/180, 30/228, 210, 188, 216, 249; 81/367, 373

[56] References Cited

U.S. PATENT DOCUMENTS

| | | | |
|---|---|---|---|
| 633,588 | 9/1899 | Helwig | 30/180 |
| 2,743,707 | 5/1956 | Kellersman | 30/228 |
| 3,058,214 | 10/1962 | Mekler . | |
| 3,178,816 | 4/1965 | Schmid | 30/180 |
| 3,255,525 | 6/1966 | Frenzel | 30/180 |
| 3,401,455 | 9/1968 | Gebauer | 30/228 |
| 3,630,068 | 12/1971 | Floyd, Jr. | 81/367 |
| 4,359,821 | 11/1982 | Pellenc | 30/228 |
| 5,002,135 | 3/1991 | Pellenc . | |
| 5,272,811 | 12/1993 | Armand | 30/228 |
| 5,353,504 | 10/1994 | Pai | 30/228 |

FOREIGN PATENT DOCUMENTS

| | | |
|---|---|---|
| 1503135 | 6/1969 | Germany . |
| 2903252 | 9/1980 | Germany . |
| 3527922 | 2/1987 | Germany . |
| 3719442 | 12/1988 | Germany . |

*Primary Examiner*—Scott A. Smith
*Attorney, Agent, or Firm*—Birch, Stewart, Kolasch & Birch, LLP

[57] ABSTRACT

Pliers (1) have a pliers housing (2), a handle (6) which is articulated on the pliers housing (2), a pliers mouth (3) which accommodates processing elements, and a drive device, which can be operated by pivoting the handle (6), in order to drive the processing elements. An electric motor (18) is arranged in the pliers housing (2) in order to exert a further drive force on the processing elements during pivoting of the handle (6).

17 Claims, 5 Drawing Sheets

SERVO-PLIERS

FIELD OF THE INVENTION

The invention relates to pliers with an electric motor in the pliers housing for exerting a further driving force during operation of the pliers.

DESCRIPTION OF THE BACKGROUND ART

Such pliers are generally known and include a pliers housing, a handle which is articulated on the pliers housing, a pliers mouth which accommodates processing elements, and a drive device, which can be operated by pivoting the handle, for driving the processing elements. These pliers may be, for example, crimping pliers, cutting pliers and the like.

Furthermore, tools which are driven by electric motors are already known, by means of which cutting processes, crimping processes, stripping processes etc. can likewise be carried out. In their interior, these tools have an electric motor, for example a battery-operated electric motor, via which the processing elements of the tool can be driven.

SUMMARY OF THE INVENTION

The invention is based on the object of ensuring, in the case of pliers of the type mentioned initially, that tasks carried out using said pliers do not lead to the user becoming tired even over a relatively long time.

Pliers according to the invention achieve this object by using an electric motor is arranged in the pliers housing in order to exert a further drive force on the processing elements during pivoting of the handle.

The basic idea of the invention is to assist the manually powered operation of the pliers by motor power, so that a user of the pliers no longer needs to apply all the force required for a processing operation, but only a part of it, since the remaining force is made available via the electric motor. In this case, when the pliers are used correctly, the electric motor is switched on only when the handle is also operated, and is switched off when the handle is released. This can also be done if the handle, which can pivot, has not reached its limit positions. In other words, if the handle is released before completion of a processing operation, then the electric motor also stops and is not switched on again until the handle is operated or moved further once again.

A suitable switch for switching the electric motor on and off is for this purpose located on the handle, which can pivot, or on a further handle which is fixed to the housing. In this case, the switch is located in a region of the handle which is acted on by the hand during operation of the pliers so that the switch is thus switched on and off only when the handles are touched directly. According to a particularly advantageous refinement of the invention, the switches can be operated via pistol grips which are articulated on the handle and on the further handle such that they can pivot. If a user's hand engages around the pliers handle in order to pivot the latter in the direction of the pliers housing, then the movable pistol grip is located between the handle and the user's hand, being pressed against the switch and holding the switch in an on position until the pliers are closed. If it is intended to open the pliers again, the handle is released, and thus the pistol grip as well, which then leads to the switch opening and thus to the electric motor being turned off.

In this case, the switch cannot be closed until a predetermined gripping force is exerted, that is to say not until a predetermined opposing force has been reached in the pliers mouth. This is the case, for example, when an object which is to be processed is located in the pliers mouth and this object is held with a predetermined force by the processing elements which have already been moved into position. If the pliers mouth is empty, then the electric motor is not switched on at all during closure of the pliers, if the force to switch the switch on has been preset appropriately. To a certain extent, this contributes to saving electrical energy. On the other hand, the power consumption of the electric motor depends on how powerfully the pliers are closed by the user. As a rule, the electric motor thus does not consume all the energy which is required if it had to close the pliers mouth on its own during processing, so that the consumption of electrical energy is also kept within limits. Adjusting means, in order to allow the gripping force to be preset appropriately, can be provided for adjusting the predetermined gripping force. The greater the preset force, the greater must the energy be which the user applies to the pliers, and the less the motor power.

The pliers can be provided with a rotation direction reversing switch for reversing the rotation direction of the electric motor, which reversing switch can be operated in the situation in which the pliers jam before reaching their final closed position.

The electric motor itself can be operated via a battery or a main power supply unit which can be connected to the pliers. For battery operation, it is intended to provide a battery compartment in the pliers housing, in order to accommodate one or more batteries for the electric motor.

The electric motor can act directly on the processing elements, or else can transmit its force to the processing elements via the drive device.

According to an advantageous refinement of the invention, the drive device is designed as a toggle lever whose joint is in contact with a cam disc which is driven by the electric motor. In this case, the cam disc can be firmly seated on a bevel gear which engages with a spur gear which is seated on a shaft of the electric motor. In this case, the toggle lever preferably acts on only one of the processing elements, while the other processing element is firmly seated in the pliers mouth. The firmly seated processing element can, for example, be an opposing blade or opposing bearing, while the adjustable processing element can be a cutting blade, a die or the like.

A limit turn-off switch is attached to one end of a lever, which can pivot, in order to turn off the electric motor, the other end of which lever is supported on the movable processing element, in order to turn the electric motor off upon reaching the final closed position of the pliers. When the movable processing element is moved into the pliers mouth, then the lever is pivoted which leads to the limit turn-off switch being moved into a position in which it can be operated by the cam disc once it has assumed a position corresponding to the final closed position of the pliers. If the pliers are opened by hand after this, to be precise by pivoting the handle or pliers handle, then the limit turn-off switch is consequently pivoted out of the stated path again and is closed, so that a new operating cycle can now start.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is described in more detail in the following text, with reference to a drawings which are given by way of illustration only, and thus are not limitative of the present invention.

DETAILED DESCRIPTION OF THE PREFERRED EMBODIMENTS

Figure 1:
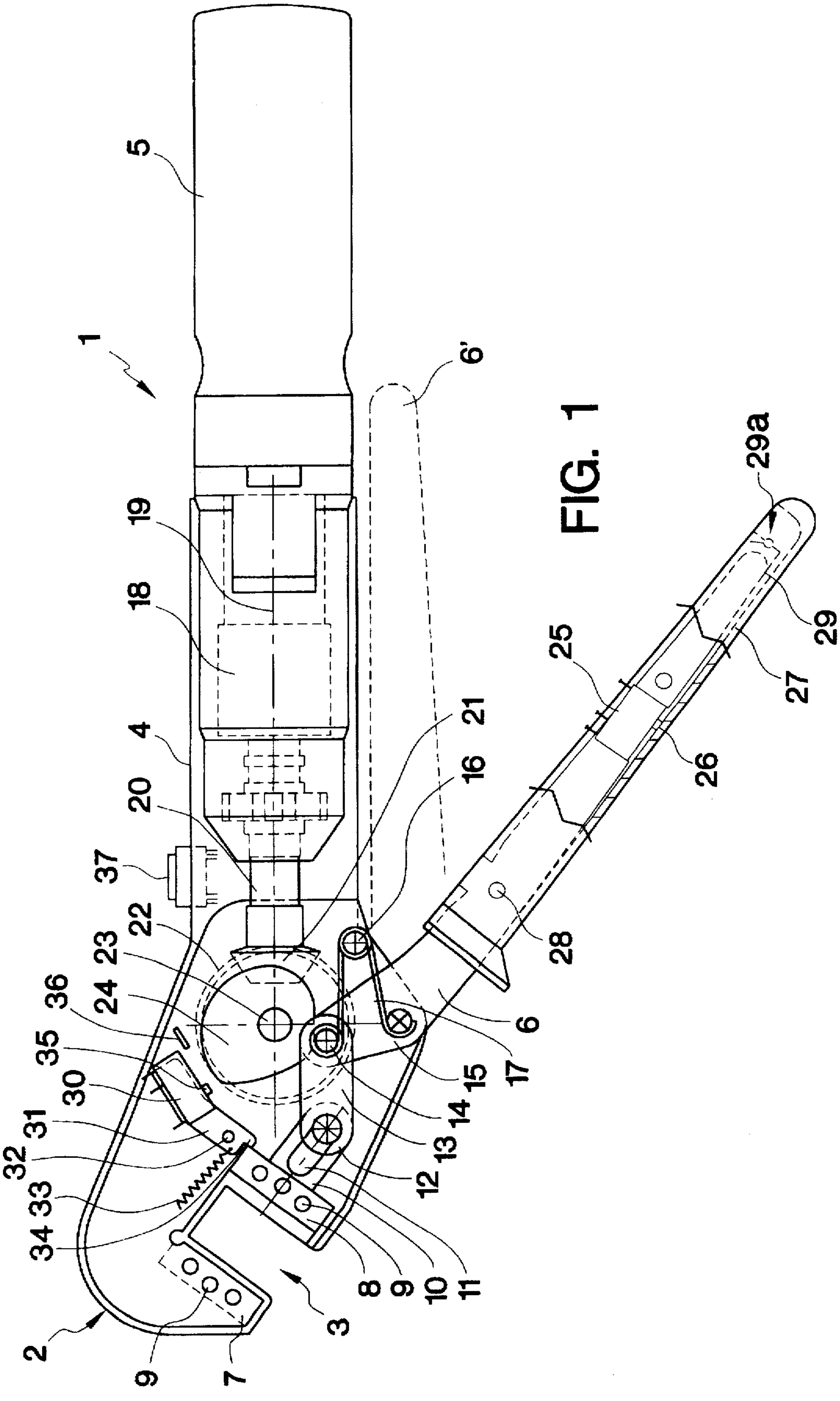
FIG. 1 shows pliers according to a first exemplary embodiment of the invention.

The pliers according to the first exemplary embodiment of the invention are described in detail in the following text.

In general, the pliers are denoted by the reference number 1 and have a pliers housing 2 at whose front end a pliers mouth 3 is located. The center part of the pliers housing 2 is designed as a handle 4 which is fixed to the housing, while the rear part of the pliers housing 2 is designed as a holder 5 in which, for example, batteries can be accommodated. A handle 6, which can pivot, is articulated on the lower side of the pliers housing 2, in the region between the front end of the handle 4, which is fixed to the housing, and the pliers mouth 3.

A first holder 7, which is fixed to the housing, for accommodating a first processing element, which is fixed to the housing, as well as a second moving holder 8, which is opposite said first holder 7, for accommodating a moving processing element are located in the pliers mouth 3. The two processing elements can be secured in the holders 7, 8 by means of bolts, for which purpose the holders 7, 8 are provided with corresponding throughholes 9. The processing elements can be displaced with respect to one another, by displacement of the moving holder 8 relative to the holder 7 which is fixed to the housing, in order to process an object which is located between them. The processing elements can be, for example, cutting blades if the pliers 1 are intended to be used for cutting purposes, or a stamp and die if they are, for example, crimping pliers. The processing elements can also be stamping or forming elements.

A sliding guide, which is not illustrated, is provided within the front part of the pliers housing 2 for the moving holder 8. On the other hand, the moving holder 8 is integrally connected on its side pointing towards the handle 6 to an attachment 10 which extends in the direction of the handle 6 and is provided with an elongated hole 11 extending in the same direction. A pin 12, which holds a lug 13 at one lug end, projects into this elongated hole 11. A further pin 14 passes through the opposite lug end and, at the same time, that end of the handle 6 which faces the pliers housing. A bearing pin 15, which is fixed to the housing, is located at a distance from this further pin 14 in the direction of the free end of the handle 6. The handle 6, which can pivot, is mounted such that it can rotate about said bearing pin 15. The lug 13 and that section of the handle 6 which is present between the pins 14 and 15 thus form a toggle lever whose joint is the further pin 14.

It should be mentioned that the handle 6, which can pivot, can be designed in the form of a fork at its end facing the pliers housing 2, and that two parallel lugs 13 can be provided, located one behind the other. The lugs 13 are then located at the respective ends of the pins 12 and 14.

In order to hold the pliers 1 open when not in use, a further pin 16, which is fixed to the housing, is provided about which an expanding spring 17 is wound. The spring 17 which also engages around the pins 14 and 15. The spring is in this case supported on the bearing pin 15, is fixed to the housing, and presses the further pin 14 upwards such that the toggle lever buckles. In consequence, the handle 6, which can pivot, assumes its greatest angular separation from the pliers housing 2, while the pliers material 3 is completely open.

An electric motor 18, whose longitudinal axis 19 or shaft 20 runs in the longitudinal direction of the pliers housing 2, is located within the handle 4 which is fixed to the housing. Batteries can be located in the rear housing part 5, for operating the electric motor 18. The rear housing is connected, for example, by means of a plug connection, to the handle 4 which is fixed to the housing. Plug contacts can be provided in the region of the plug connection, in order to allow the battery terminals to be connected in a simple manner to the corresponding connections of the electric motor 18. This will be described in more detail below.

The free end of the shaft 20 of the electric motor 18 extends in the direction of the pliers mouth 3 and is fitted with a spur gear 21, which is firmly connected to it. This spur gear 21, has teeth which are located on a conical surface symmetrically with respect to the longitudinal axis 15. The spur gear 23 engages a bevel gear 22 which is mounted on a shaft 23 which is fixed to the housing. The spur gear 21 lies on the longitudinal axis 19 and at right angles thereto, and is located above the pin 14. A cam disc 24, which is likewise mounted on the shaft 23, is located on one side of the bevel gear 22, and is firmly connected thereto. The cam disc 24 comes into contact with the further pin 14 of the toggle lever, so that the position of the toggle lever can be adjusted during rotation of the cam disc 24. Thus, when the electric motor 18 rotates, the bevel gear 22 and, with it, the cam disc 24 are driven via the shaft 20 and the spur gear 21, which leads to the holder 8 being driven in a corresponding manner via the toggle lever. The position of the toggle lever is in this case dependent, however, on the shape of the cam disc 24, which is still to be described.

A handle switch 25 is located in the handle 6, which can pivot, in order to make it possible to switch on the electric motor 18. This handle switch 25 is an on/off switch whose switching tab 26 is located on the front longitudinal side of the handle 6. A pistol grip 27 is furthermore mounted on the handle 6, to be precise at the handle end facing the toggle lever. A bearing pin 28, which passes laterally through the pistol grip 27, is located on the handle 6 for this purpose. The pistol grip 27 can thus be pivoted slightly about the bearing pin 28 with respect to the handle 6. The pistol grip 27 also covers the front longitudinal side of the handle 6 and thus is located on the switching tab 26 of the handle switch 25. In other words, if the pistol grip 25 is pivoted counter-clockwise about the bearing pin 28 relative to the handle 6, then the switching tab 26 is operated and the handle switch 25 is thus closed, which leads to the electric motor 18 being switched on. However, the switching tab 26 is in this case preferably prestressed by a spring, which is not illustrated, such that it cannot be operated, and the switch 25 closed, until after a predetermined switching force has been applied via the pistol grip 27. The spring can be located within the switch 25. Alternatively, instead of this spring, a compression spring 29 can also be provided between the inside of the pistol grip 27 and the front side of the handle 6. The force of the compression spring 29 can be varied by suitable adjusting means 29*a*, which are located externally on the pistol grip 27.

Furthermore, another limit turn-off switch 30 is located on the circumference of the cam disc 24. This limit turn-off switch 30 is mounted at one end of the lever 31, which can pivot about a shaft 32 which is fixed to the housing and is supported on the moving holder 8 by means of its other end, which overhangs the shaft 32 which is fixed to the housing. In this case, the lever 31 is prestressed clockwise by tension spring 33 about the shaft 32, which is fixed to the housing. However, it cannot rotate about the shaft 32 since its other end has a tab 34 which rests on the moving holder 8. The load on the tab 34 is not relieved until the handle 6 is pivoted in the direction of the handle 4 which is fixed to the housing, that is to say the toggle lever is extended. Therefore, the lever 31 can rotate slightly clockwise about the shaft 32 which is fixed to the housing, to be precise until a switching tab 35 of the limit turn-off switch 30 has assumed a predetermined position. A stop 36, which is fixed to the housing, can be provided for this purpose in the movement path of the limit turn-off switch 30. When the pliers are closing, the limit turn-off switch 30 abutts against the stop 36 and thus positions the switching tab 35, so that the latter can be operated by the cam disc 24 in the region of its greatest radial extent, in order to turn off the electric motor 18.

If, for any reason, it is not possible to close the pliers 1 entirely, then the rotation direction of the electric motor 18 can be reversed with the aid of a rotation direction reversing switch 37, which is located in the region of the handle 4 which is fixed to the housing.

The operation of the pliers according to the invention is explained in more detail in the following text. First of all, it is assumed that no object to be processed is located in the pliers mouth 3.

If the handle 6 is now moved into the position 6', then the toggle lever is extended and at the same time presses the holder 8 into the pliers mouth 3. The holders 7 and 8 can in this case be fitted with suitable processing elements, as already mentioned. Since no opposing force acts on the processing elements in the region of the pliers mouth 3, the handle 6 can pivot relatively easily, that is to say with little force being exerted. The force of the spring 29 is therefore not overcome. In this case, the switch 25 is not closed, so that the electric motor 18 can also not start to run. If the handle 6 is released after this, then the spring 17 presses said handle 6 back into the original position.

If, in contrast, an object to be processed is located in the pliers mouth 3, then the switch 25 is not operated by the pistol grip 27 until the processing elements have been moved with a predetermined force against the object to be processed. If the opposing force is now produced in the pliers mouth 3, the handle 6 can no longer be pivoted so easily in the direction of the handle 4 which is fixed to the housing, so that the user must exert a greater manual force. However, the force of the compression spring 29 can now be overcome, which leads to the pistol grip 28 pivoting with respect to the handle 6, and thus to operation of the switching tab 26. The switch 25 is now switched on, which leads to rotation of the electric motor 18. In the event of further operation of the handle 6, the movable processing element is now displaced not only via the handle 6 by the force of the user but also with the aid of the electric motor. At the same time, the cam disc 24 rotates clock-wise and, because of the course of its circumference, contributes to the extending of the toggle lever. The toggle lever is extended to its greatest extent when that region of the cam disc 24 which is located furthest outwards acts on the pin 14. After this, the electric motor 18 continues to rotate further over a certain angular region until that region of the cam disc 24 which is located furthest outwards acts on the switching tab 35 and the limit turn-off switch 30 is consequently operated, which leads to the electric motor 18 stopping. The toggle lever can now buckle again as a result of the chosen shape of the cam disc 24, so that the handle 6 moves back to its original position and the pliers mouth 3 opens. While the handle 6 is moving back into its original position, the lever 31 is rotated counter-clockwise about the shaft 32, so that the limit turn-off switch 30 is removed from the stop 36 again, and the switching tab 35 comes free. The limit turn-off switch 30 is then closed again. However, the electric motor 18 remains stationary since, in this case, there is also no load on the pistol grip 27, and the handle switch 25 is thus open.

Figure 2:
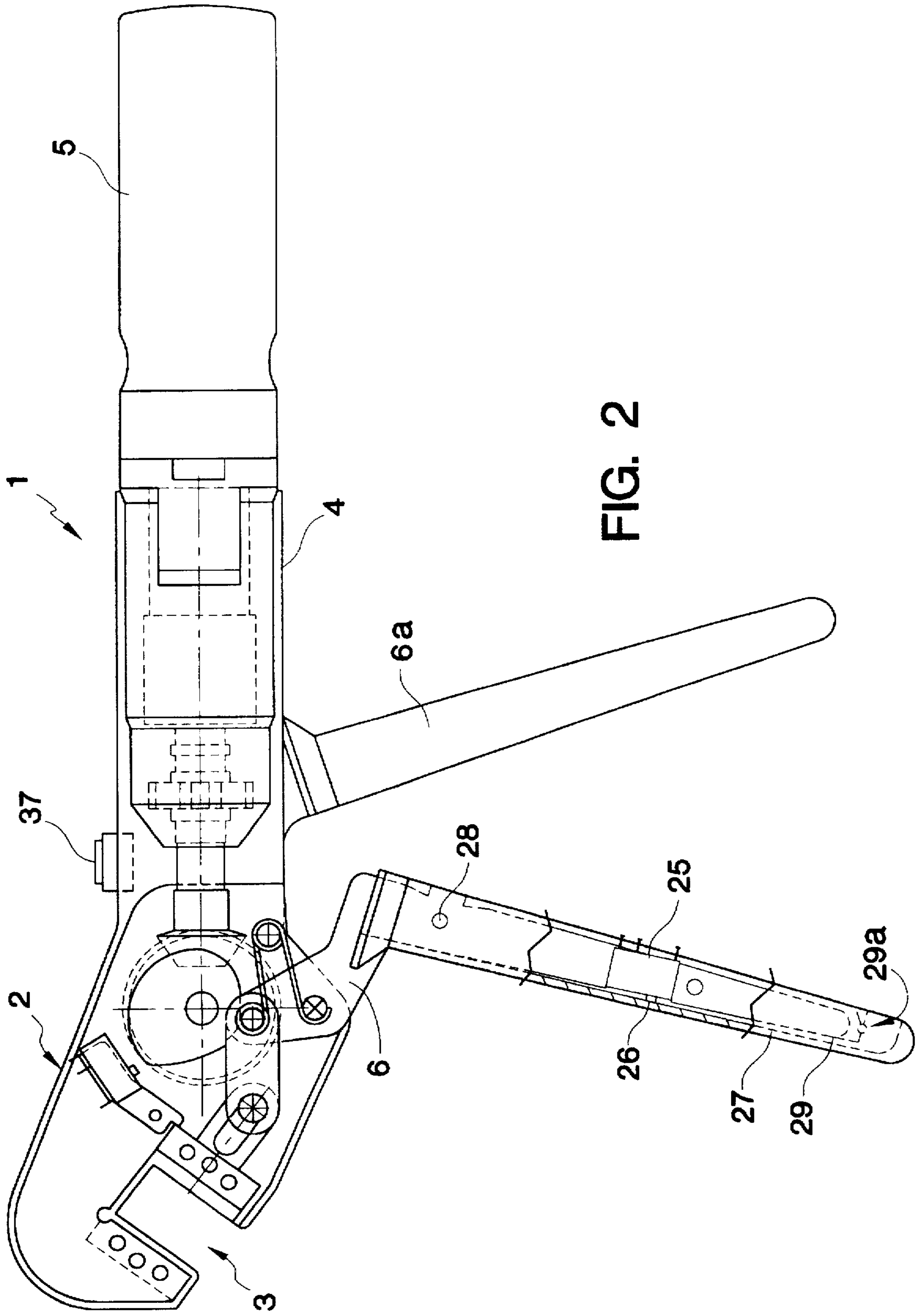
FIG. 2 shows pliers according to a second exemplary embodiment; of the invention.

FIG. 2 shows a second exemplary embodiment of the pliers according to the invention. This exemplary embodiment is essentially identical to the first exemplary embodiment, but the handle 6 is in this case bent 90° downwards. Furthermore, a further or additional handle 6*a*, which is fixed to the housing, is provided on the lower wall region of the center part 4 of the pliers housing 2.

Figure 3:
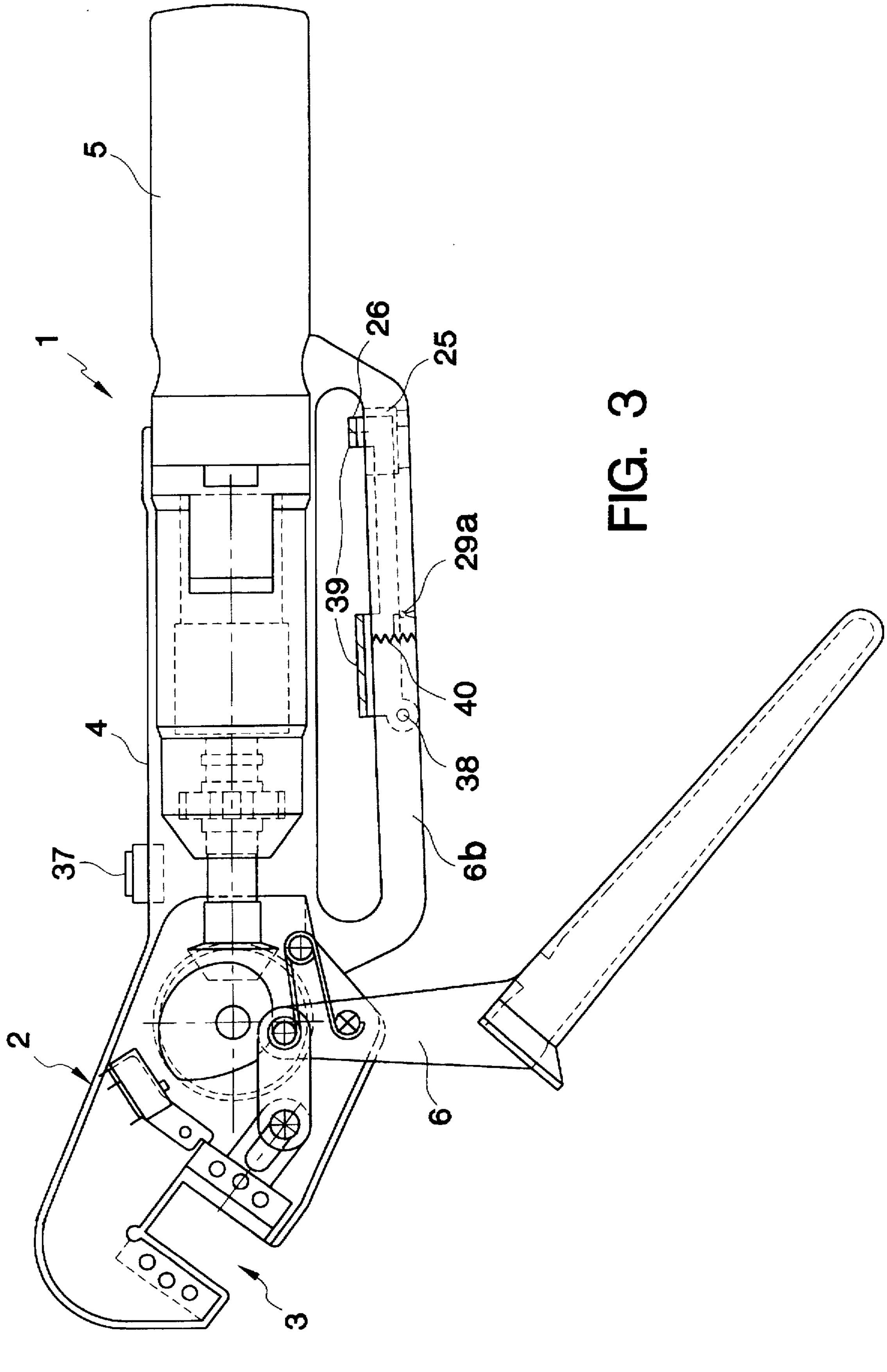
FIG. 3 shows pliers according to a third exemplary embodiment of the invention

In the case of a third exemplary embodiment according to FIG. 3, in addition to the already mentioned handle 6, there is an additional handle 6*b*, which is fixed to the housing, parallel to the center part 4 of the pliers housing 2. The switch 25, with the switching tab 26, is in this case provided in this parallel handle 6*b*, a further pistol grip 39 furthermore being mounted, by means of a shaft 38, on the inside of this parallel handle 6*b*, such that said pistol grip 39 can pivot relative to the handle 6*b*. The switching tab 26 is in turn operated by this further pistol grip 39 once a predetermined force has been overcome, which force is preset, for example, by means of a compression spring 40 which is located between the further pistol grip and the handle 6*b*. In operation, the pliers 1 according to FIG. 3 are held such that the pliers mouth 3 points upwards. At the same time, a user's fingers engage in the region which is located between the center part 4 and the further handle 6*b*, while the handle 6 is located in the user's hand area.

Figure 4:
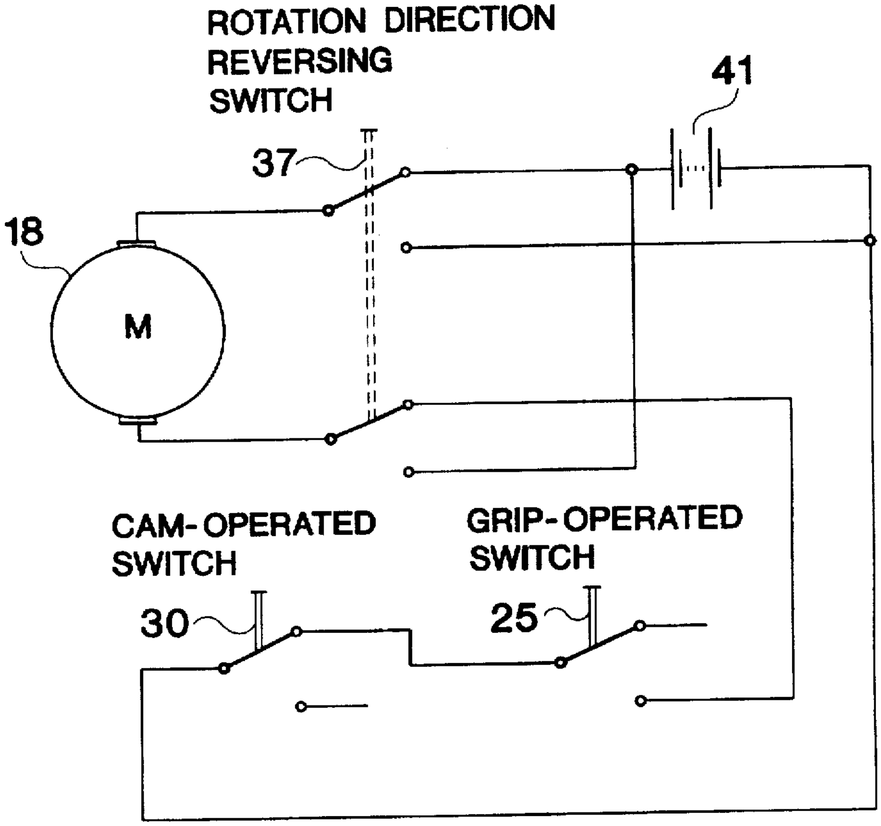
FIG. 4 shows an electrical circuit for the pliers according to FIGS. 1 to 3 and FIG. 5 shows pliers according to a fourth exemplary embodiment of the invention.

FIG. 4 shows the electrical circuit diagram of the pliers according to the invention, in accordance with the exemplary embodiments according to FIGS. 1, 2 and 3. The electric motor 18 is in this case electrically connected in series with a first switching contact of the rotation direction reversing switch 37, with a battery 41, with a switching contact of the limit turn-off switch 30 (cam-operated switch), with a switching contact of the handle switch 25, and with a second switching contact of the rotation direction reversing switch 37. In the rest position, the limit turn-off switch 30 is closed, while the handle switch 25 is open.

Figure 5:
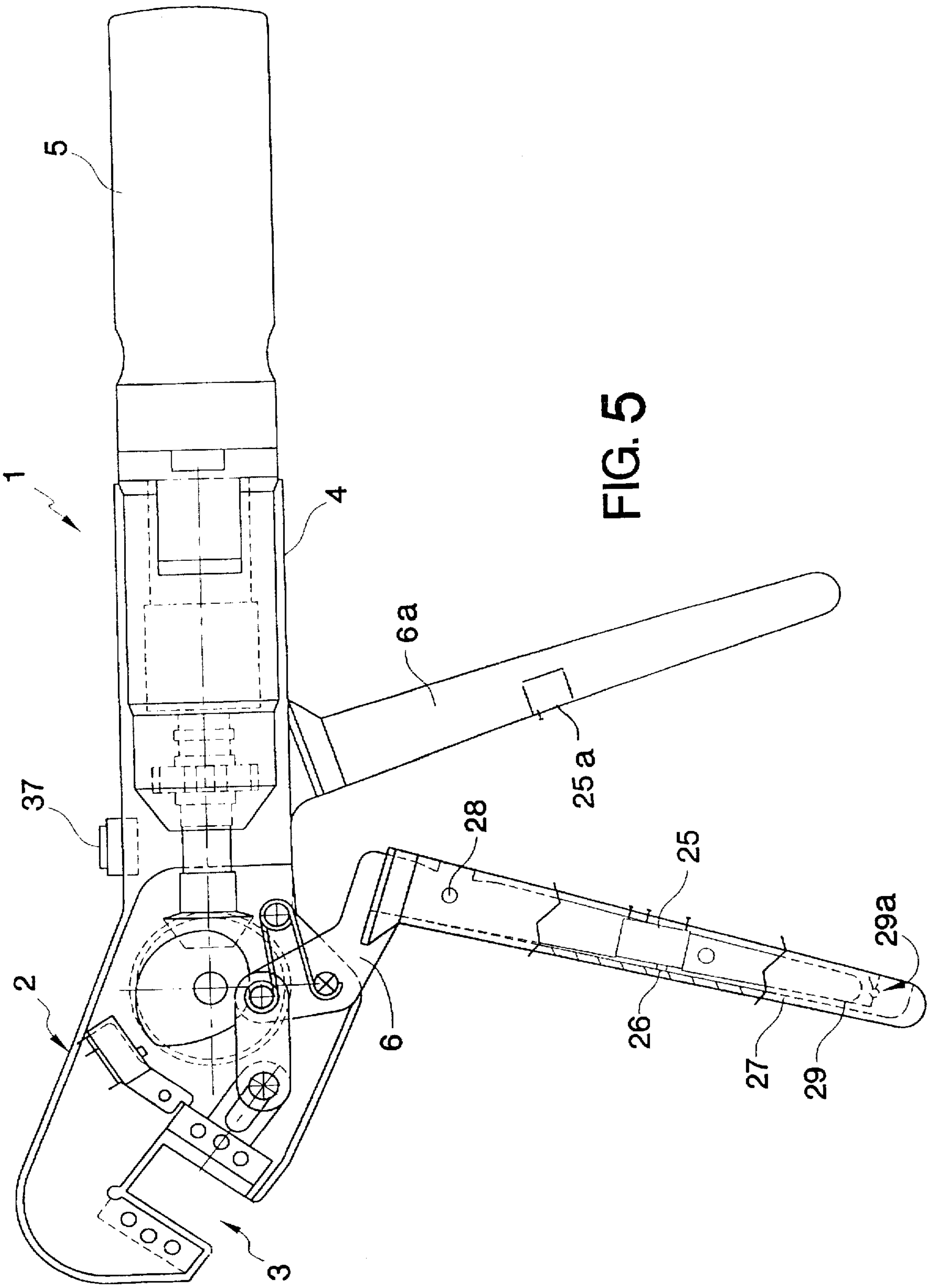

FIG. 5 shows a fourth exemplary embodiment of the pliers. Here a switch 25*a* could be provided in addition to switch 25 on additional handle 6*b*.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. Pliers comprising a housing, a handle, a switch on the handle, a pliers mouth, a drive device and a motor, the handle being pivotably mounted on the pliers housing, the pliers mouth accommodating processing elements and the drive device, the drive device being operated by pivoting the handle, the drive device driving the processing elements, the motor being in the pliers housing and exerting a further driving force on the processing elements in addition to the drive device, the motor exerting the further driving force during pivoting of the handle, operation of the switch activating the motor, said switch being operated by a gripping force such that the switch is open until a predetermined gripping force is exerted on the switch whereupon the switch is closed and the motor is actuated.

2. The pliers according to claim 1, further comprising a pistol grip pivotably mounted on the handle, the switch being operated by the pistol grip.

3. The pliers according to claim 1, further comprising an additional handle.

4. The pliers according to claim 1, further comprising an additional handle, a further switch on the additional handle, and pistol grips, the additional handle being mounted on the housing, operation of either the first or second switch activating the motor, the pistol grips being pivotably mounted on the handle and the additional handle, the switches being operated by the pistol grips.

5. The pliers according to claim 4, wherein the switches are open until a predetermined gripping force is exerted on at least one of the pistol grips whereupon at least one of the switches is closed and the motor is actuated.

6. The pliers according to claim 5, further comprising means for adjusting the predetermined gripping force.

7. The pliers according to claim 1, wherein the motor exerts the further driving force on the processing elements via the drive device.

8. The pliers according to claim 7, further comprising a cam disc in the pliers housing, the drive device being a toggle lever with a joint in contact with the cam disc and the cam disc being operatively connected to and being driven by the motor.

9. The pliers according to claim 8, further comprising a bevel gear and a spur gear, the bevel gear being engaged with the spur gear and the spur gear being seated on a shaft of the motor, the cam disc being firmly seated on the bevel gear.

10. The pliers according to claim 8, wherein the toggle lever acts on only one of the processing elements while an other processing element is firmly seated in the pliers mouth.

11. The pliers according to claim 9, wherein the toggle lever acts on only one of the processing elements while an other processing element is firmly seated in the pliers mouth.

12. The pliers according to claim 8, further comprising a limit turn-off switch and a lever, the lever being pivotable and being attached at one end to the limit turn-off switch and at an other end being supported on the processing element, the limit turn-off switch deactivating the motor upon operation of the limit turn-off switch.

13. The pliers according to claim 9, further comprising a limit turn-off switch and a lever, the lever being pivotable and being attached at one end to the limit turn-off switch and at an other end being supported on the processing element, the limit turn-off switch deactivating the motor upon operation of the limit turn-off switch.

14. The pliers according to claim 10, further comprising a limit turn-off switch and a lever, the lever being pivotable and being attached at one end to the limit turn-off switch and at an other end being supported on the processing element, the limit turn-off switch deactivating the motor upon operation of the limit turn-off switch.

15. The pliers according to claim 1, further comprising a rotation direction reversing switch for reversing rotation of the motor.

16. The pliers according to claim 1, further comprising a battery compartment for accommodating a battery, the battery compartment being in the housing.

17. The pliers according to claim 1, wherein the motor is an electric motor.

* * * * *